United States Patent [19]

Ohtsuka et al.

[11] Patent Number: 5,297,263
[45] Date of Patent: Mar. 22, 1994

[54] MICROPROCESSOR WITH PIPELINE SYSTEM HAVING EXCEPTION PROCESSING FEATURES

[75] Inventors: Akira Ohtsuka; Toru Shimizu, both of Itami, Japan

[73] Assignee: Mitsubishi Denki Kabushiki Kaisha, Tokyo, Japan

[21] Appl. No.: 871,598

[22] Filed: Apr. 17, 1992

Related U.S. Application Data

[63] Continuation of Ser. No. 637,924, Jan. 8, 1991, abandoned, which is a continuation of Ser. No. 170,508, Mar. 21, 1988, abandoned.

[30] Foreign Application Priority Data

Jul. 17, 1987 [JP] Japan ................. 62-179365

[51] Int. Cl.⁵ ................. G06F 11/00; G06F 9/38
[52] U.S. Cl. ................. 395/375; 395/800; 371/16.5; 364/231.8; 364/265; 364/265.6; 364/261.3; 364/DIG. 1
[58] Field of Search ........... 364/DIG. 1 MS File, 364/DIG. 2 MS File; 395/375, 800, 575, 425; 371/16.5, 12, 16.1, 350, 351, 2, 6, 8, 239, 275, 674, 636

[56] References Cited

U.S. PATENT DOCUMENTS

| | | | |
|---|---|---|---|
| 4,317,171 | 2/1982 | Maejima et al. | 364/200 |
| 4,648,034 | 3/1987 | Heninger | 364/200 |
| 4,656,578 | 4/1987 | Chilinski et al. | 364/200 |
| 4,697,233 | 9/1987 | Scheuneman et al. | 364/200 |
| 4,794,517 | 12/1988 | Jones et al. | 364/200 |
| 4,794,524 | 12/1988 | Carberry et al. | 364/200 |
| 4,875,160 | 10/1989 | Brown, III | 364/200 |
| 4,893,233 | 1/1990 | Denman et al. | 364/200 |
| 4,985,825 | 1/1991 | Webb, Jr. et al. | 364/200 |

FOREIGN PATENT DOCUMENTS 56-92643  7/1981  Japan .

Primary Examiner—Gopal C. Ray
Attorney, Agent, or Firm—Townsend and Townsend Khourie and Crew

[57] ABSTRACT

A method and apparatus for processing exceptions in a microprocessor having a plurality of pipelined stages. The method comprises the steps of generating an exception processing code at a given stage to indicate the occurrence of an exception at the given stage; temporarily stopping processing at the given stage; transferring the exception processing code to a special stage; decoding said exception processing code at the special stage; and causing the pipeline to execute exception processing when the exception processing code is decoded at the special stage. Using the invention, the microprocessor can avoid much of the delay and complexity resulting from using an external circuit to control exception processing and can cope with the occurrence of an exception at any stage without prematurely cancelling or reexecuting processing steps. The invention is simplified in both hardware and software, and can easily cope with expansion of the number of stages.

43 Claims, 12 Drawing Sheets

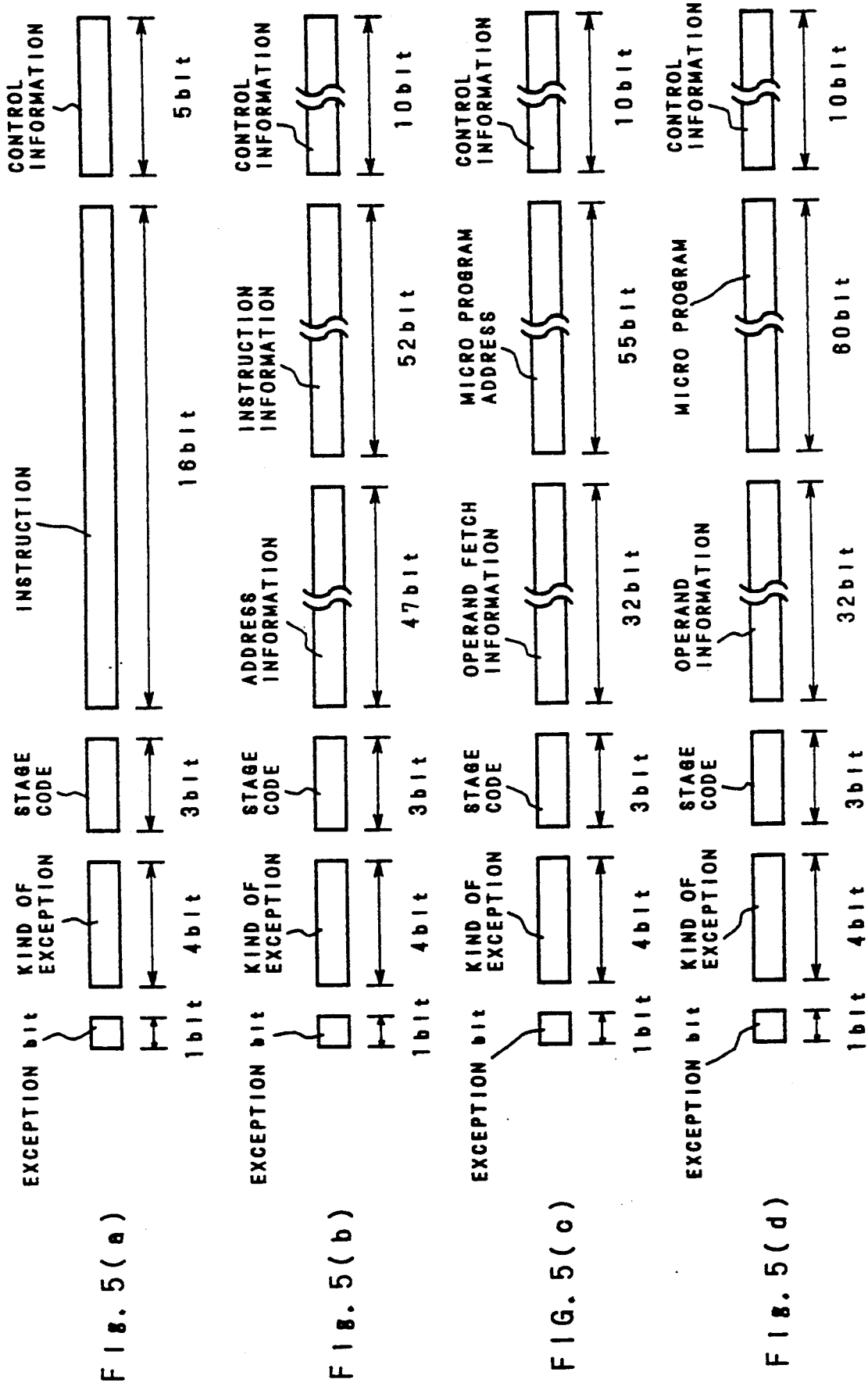

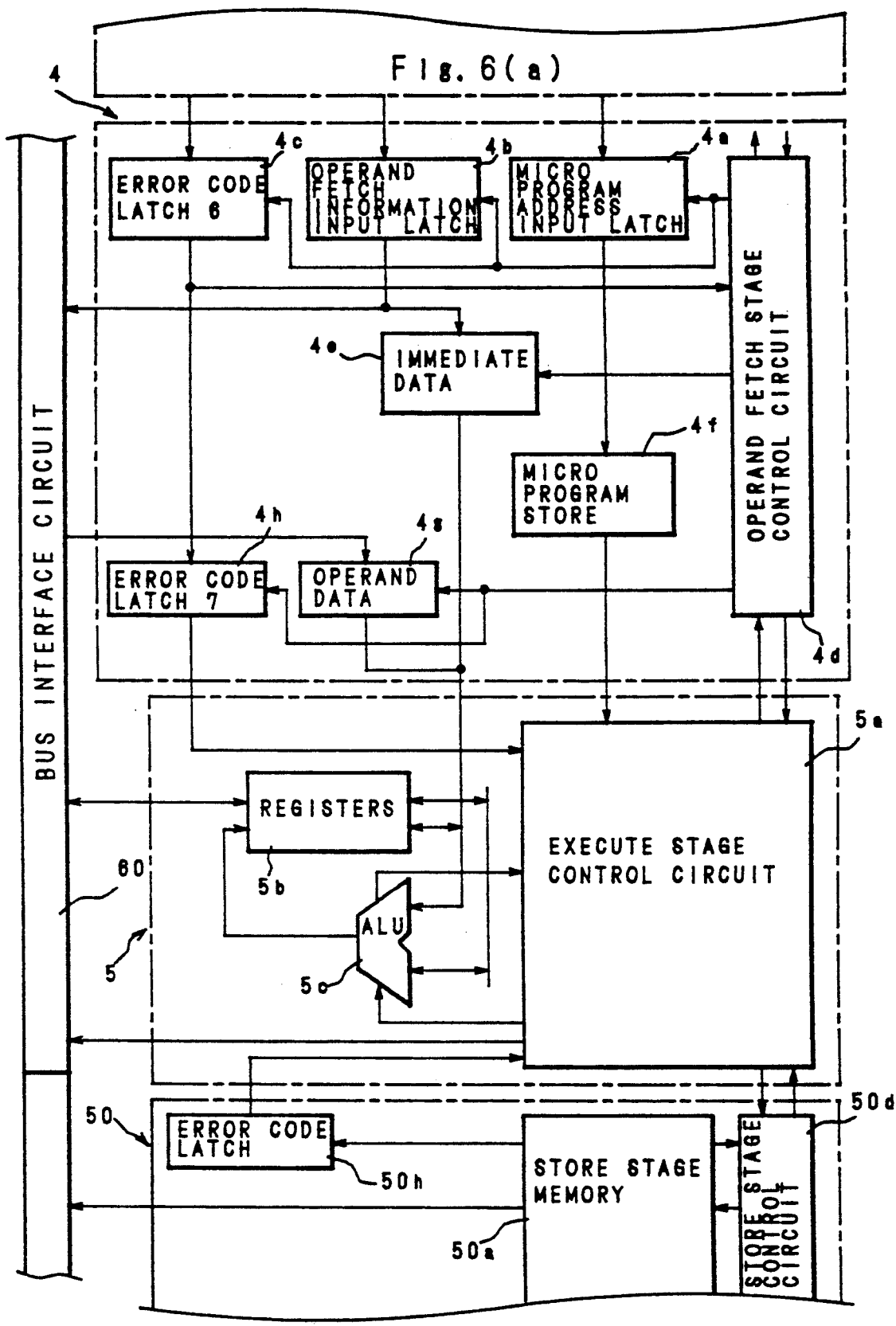

MICROPROCESSOR WITH PIPELINE SYSTEM HAVING EXCEPTION PROCESSING FEATURES

This is a continuation of application Ser. No. 07/637,924, filed Jan. 8, 1991 (now abandoned), which is a continuation of Ser. No. 170,508, filed Mar. 21, 1988 (now abandoned).

BACKGROUND OF THE INVENTION

1. Field of the Invention

The present invention relates to a microprocessor, and more particularly to a pipelined microprocessor having exception processing features.

2. Description of the Prior Art

The pipeline system has been widely put to use for improving the processing speed of the microprocessor.

In general, pipelining divides processing for a series of instructions or operations among a plurality of circuits to allow each circuit to sequentially process results simultaneously and in parallel. Pipelining does not reduce the time required to process one instruction or one operation, but reduces the overall processing time substantially in inverse proportion to the divided number of the processing circuits.

Pipelines have experienced difficulties in processing exceptions. An exception, as used herein, means any information whose processing requires a deviation from continuous, sequential processing.

When an exception occurs during pipelining, such as when an error or the like is created, the processor must cancel subsequent pipelining and reexecute the processing from the stage where the exception first occurred. Also, where pipelining is used for instruction processing, when an exception requiring a temporary interruption is encountered such as a branch instruction, various problems will be created. For example, if at a certain stage of pipelining, it is decoded that an instruction under processing is a branch instruction, so that a branch condition is established at the stage executing the decoding, the next instruction to be executed is not the following one but the branched one. Accordingly, it is required that all the following instructions having already started pipelining be canceled and the branched instruction is newly fetched into the first stage of the pipelining and thereafter the processing is reexecuted.

The automatic cancellation approach to exception processing takes additional processing steps, and therefore time, and may cause cancellation of results which are otherwise acceptable.

To further clarify some of the problems attending handling exceptions in connection with pipelined processors, consider the prior art circuit of FIG. 1.

FIG. 1 is a block diagram of the principal portion of a microprocessor having the pipelining function disclosed in the Japanese Patent Laid Open No. 56-92643 (1981).

Referring now to FIG. 1, there is shown a pipelined processor for calculation which includes five stages: an operand readout stage 17, a first calculation stage 18, a second calculation stage 19, a store/exception check stage 20, and an operand store stage 21. Also shown in FIG. 1 are corresponding flip-flops, respectively, reset-set flip-flop 15, D flip-flop 161, D flip-flop 162, D flip-flop 163, and D flip-flop 164 as will be more particularly described hereafter.

Also included in the pipeline at FIG. 1 is an operand counter 27, which, when the remainder is zero, outputs a reset signal at a high level to OR gate 241 through a signal line 23.

Also shown in FIG. 1 is a signal line 14, which conveys a control signal for indicating that processing has started, by giving R-S (reset-set)-flip-flop 15 a processing start signal for starting the calculation.

Referring again to FIG. 1, the output of the R-S-flip-flop 15 is input to the operand readout stage 17 and to a first D flip-flop 161. The output of the first D flip-flop 161 is input to the first calculation stage 18 and a second D flip-flop 162. The output of the second D flip-flop 162 is input to the second calculation stage 19 and a third D flip-flop 163. The output of the third D flip-flop 163 is input to the store/exception check stage 20 and a fourth D flip-flop 164. The output of the fourth D flip-flop 164 is input to the operand store stage 21. In addition, flip-flops 15 and 161 through 164 operate in synchronism with a clock (not shown).

Referring still to FIG. 1, there is shown an interruption priority circuit 22, which, when an exception such as an error is generated, receives as input through signal lines 251, 252, and 253 interruption request signals from the outputs of operand readout stage 17, second calculation stage 19, and store/exception check stage 20. The interruption priority circuit 22 outputs an interruption request signal to a control circuit 26 (not shown) through a signal line 26.

In addition, the aforesaid interruption request signal from the operand readout is coupled to the input of OR gates 241 and 242; the interruption request from calculation stage 19 is coupled to OR gates 241, 242, and 243; and the signal from check stage 20 is coupled to the input of OR gates 241, 242, and 243 and to D flip-flops 163 and 164.

The conventional processing unit of FIG. 1 operates as follows.

The data number for the processing object is set in operand counter 27 simultaneously with the start of pipelining and a processing start signal is given to the R-S-flip-flop 15 from a control circuit (not shown) through a signal line 14. Next, the R-S-flip-flop 15 is set to turn its output to a high level. Hence, the operand readout stage 17 of the first stage of the pipeline becomes active to start processing.

Upon turning the output of R-S-flip-flop 15 to the high level, the flip-flops 161 through 164 are synchronized with the clock so as to be set and develop the high level outputs every one clock cycle, in a lagging sequence. On the other hand, since the respective stages 17 through 21 perform processing between the respective clocks, stages 17 through 21 become active corresponding to the respective flip-flop 15 and 161 through 164 being set sequentially in synchronism with the clock, thereby performing processing in order.

Accordingly, in normal operation, the operand readout stage 17 sequentially fetches the calculation object in synchronism with the clock, the respective stages 17 through 21 sequentially process the calculation object in synchronism with the clock, and the results of processing are sequentially transferred to the next stage. Thereafter, when the operand readout stage 17 processes the last processing object and delivers the result thereof to the first calculation stage 18, the remainder in the operand counter 27 is zero. Accordingly, the reset signal (zero) is output from the operand counter 27 through the signal line 23. R-S-flip-flop 15 is thereby reset and the operand readout stage 17 is inactivated. The following stages 18 through 21 respectively process the last processing object sequentially in synchronism with the clock and the results of processing are sequentially transferred to the next stage in order. Also, as the respective D flip-flops 161 through 164 are reset in lagging sequential order in synchronism with the clock, the respective stages 18 through 21 are sequentially inactivated.

The above operation is under normal processing conditions, but when an exception such as an error is received or generated the operation of the microprocessor is as follows.

When an error occurs at a given stage, the data being processed at the stage where the error is created is cancelled, and the processing results in preceding stages (following processing) which are high in the possibility of generating the error are also cancelled. Cancellation in all such stages is inefficient, however, when, for example, the error is an isolated occurrence at one stage. The processing in succeeding stages ahead of the stage generating the error (preceding processing) is effective, whereby the preceding processing is continued until it reaches the last stage in the pipeline.

Referring again to FIG. 1, when an error occurs, an interruption request signal 251, 252, and 253 is output from either one of the operand readout stage 17, second calculation stage 19, or store/exception check stage 20, and the flip-flop corresponding to the interruption request signal, and that at preceding stages are reset. Simultaneously, the interruption request signal is input to the interruption priority circuit 22 and supplied to the control circuit (not shown) through the signal line 26.

When the control circuit accepts the interruption, all following pipelining will be reexecuted on the basis of set/reset (level of output signal) of the flip-flops 15 and 161 through 164 and an obtained count of the operand counter 27. Thus, in order to process exceptions, set/reset signals must be conveyed to the external control circuit, the external control circuit must accept the interruption, and the nature of the error and the proper response must be determined by the control circuit. Further, as shown in FIG. 1, the stage which checks for exceptions is a separate stage at the end of the pipeline.

In addition, when an error is generated simultaneously at a plurality of stages, the flip-flops corresponding to the most advanced stage and all preceding stages are all reset and the interruption priority circuit 22 decides the interruption priority. All processing following the stage where the error occurred is automatically cancelled.

Moreover, a problem occurs in implementing a control circuit for the processor in FIG. 1 in that as the number of stages for the pipeline increases, the program and circuitry for control become complicated and large-scale. In addition, additional delay is created because signals must be conveyed to and received from the complicated external control circuit which must also determine the source of the exception, the kind of exception, and the proper response.

The aforesaid prior art is exemplary of pipelining for calculation, but besides this, the Japanese Patent Laid-Open No. 57-29155 (1982) discloses an example of pipelining for instruction processing.

From the foregoing, it can be seen that what is needed when an exception occurs during pipelined processing is a means to delay cancellation or reexecution by the pipeline until after the entire preceding instruction groups in advance complete execution, and the error can be properly analyzed and isolated.

What is also needed is a simple method for indicating the stage of the pipeline at which the exception occurred and for controlling cancellation and reexecution of processing such that circuit complexity, delay, decision, and reexecution time is kept to a minimum.

SUMMARY OF THE INVENTION

In the light of the above problems, the present invention has been designed.

A first object of this invention is to provide a microprocessor having a pipeline system which can cope with generation of exceptions at any stage of the pipeline.

Yet another object of the invention is to provide a processor which performs exception processing without using an elaborate external control circuit. Still another object of the invention is to provide a processor which performs exception processing without unnecessarily cancelling or reexecuting previously performed processing.

Another object of this invention is to provide a microprocessor capable of easily coping, in a hardware and software manner, with variations in the number of stages of the pipeline.

Another object of this invention is to provide a processor which performs exception processing while having pipelining for both calculation and instruction processing.

According to the invention, there is provided for a processor of the type having a pipeline formed by a plurality of consecutive stages, a method for processing exceptions which includes the step of generating an exception processing code at a given stage to indicate the occurrence of an exception at the given stage, the kind of exception, and the identity of the given stage. Thereafter, processing is temporarily stopped at the given stage and the exception processing code is transferred to and decoded at a special stage which causes the pipeline to execute exception processing. In a preferred embodiment, the exception processing codes are transferred from and received at each stage in the pipeline using a plurality of D flip-flops. The exception processing code is decoded at the special stage using a logic array consisting of NAND gates, inverters, and D flip-flops.

The above and further objects and features of the invention will more fully be apparent from the following detailed description with accompanying drawings.

BRIEF DESCRIPTION OF THE DRAWINGS

FIGS. 5(a) through (d) show step codes generated by each stage, including an error code output from each stage in accordance with the invention.

DESCRIPTION OF THE PREFERRED EMBODIMENT

Figure 2:
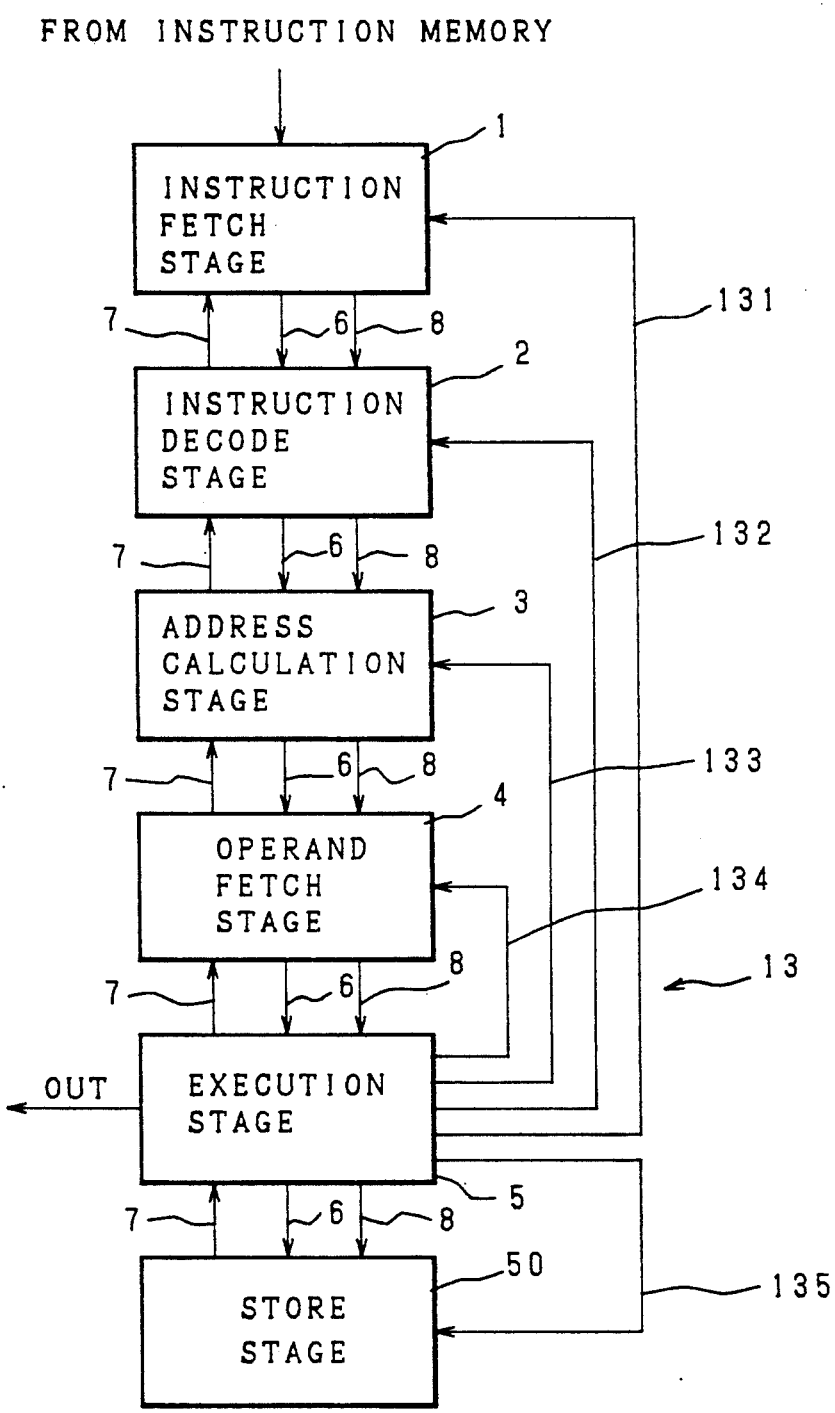
FIG. 2 is a block diagram of one embodiment of a pipeline system for a microprocessor in accordance with the invention.

Referring now to FIG. 2, there is shown a block diagram for a pipeline system for a microprocessor. Embodiments of the invention to be discussed are examples of applying the present invention to the microprocessor disclosed in U.S. application, Ser. No. 07/069,320 filed Jul 2, 1987, now abandoned, shown generally in FIG. 2, and applied as an example, to instruction processing.

In FIG. 2, six stages of a pipelined microprocessor are shown. Instruction fetch stage 1 is a first stage of the pipeline for sequentially fetching instruction read-out from an instruction memory storing therein a program. Instruction decode stage 2 is a second stage for decoding instructions fetched by the instruction fetch stage 1. Address calculating stage 3 is a third stage for obtaining the operand address included in the decoded result generated by instruction decode stage 2. Operand fetch stage 4 is a fourth stage for fetching the operand according to the address obtained by the address calculation stage 3. Execute stage 5 is a fifth stage for executing instructions for the operand fetched by the operand fetch stage 4. In the embodiments of the invention discussed herein, the execute stage is used as the special stage for decoding the exception processing code to thereby control exception processing. Also shown in FIG. 2 is a store stage 50, which is useful for storing processing codes. This store function could be included in the special stage as storing means depending on design considerations. Similarly, separate storage means could be included in each processing stage. The store function permits previous processing codes to be retrieved and used during execution of exception processing, if desired.

Referring still to FIG. 2, also shown is step code 6, which is sent from a given stage to the next succeeding stage. Step code 6 includes the processing result of the given stage, information necessary for control of the next stage, and may include an exception code. Step code 6 is introduced from an output latch of the given stage to an input latch of the succeeding stage and then latched thereby as will be more fully discussed hereafter. Also shown is an input latch vacancy signal 7, which is coupled to the given stage from the succeeding stage when the succeeding stage is in a condition of enabling the next processing object.

Further shown is an output latch effective signal 8, which is output from the given stage to the succeeding stage when the step code 6 is generated at the given stage and latched by the output latch for the given stage. Also shown in FIG. 2 is a control bus 13 which may be comprised of a plurality of control lines 131, 132, 133, 134, and 135 from the special stage to the other stages in the pipeline.

Figure 3:
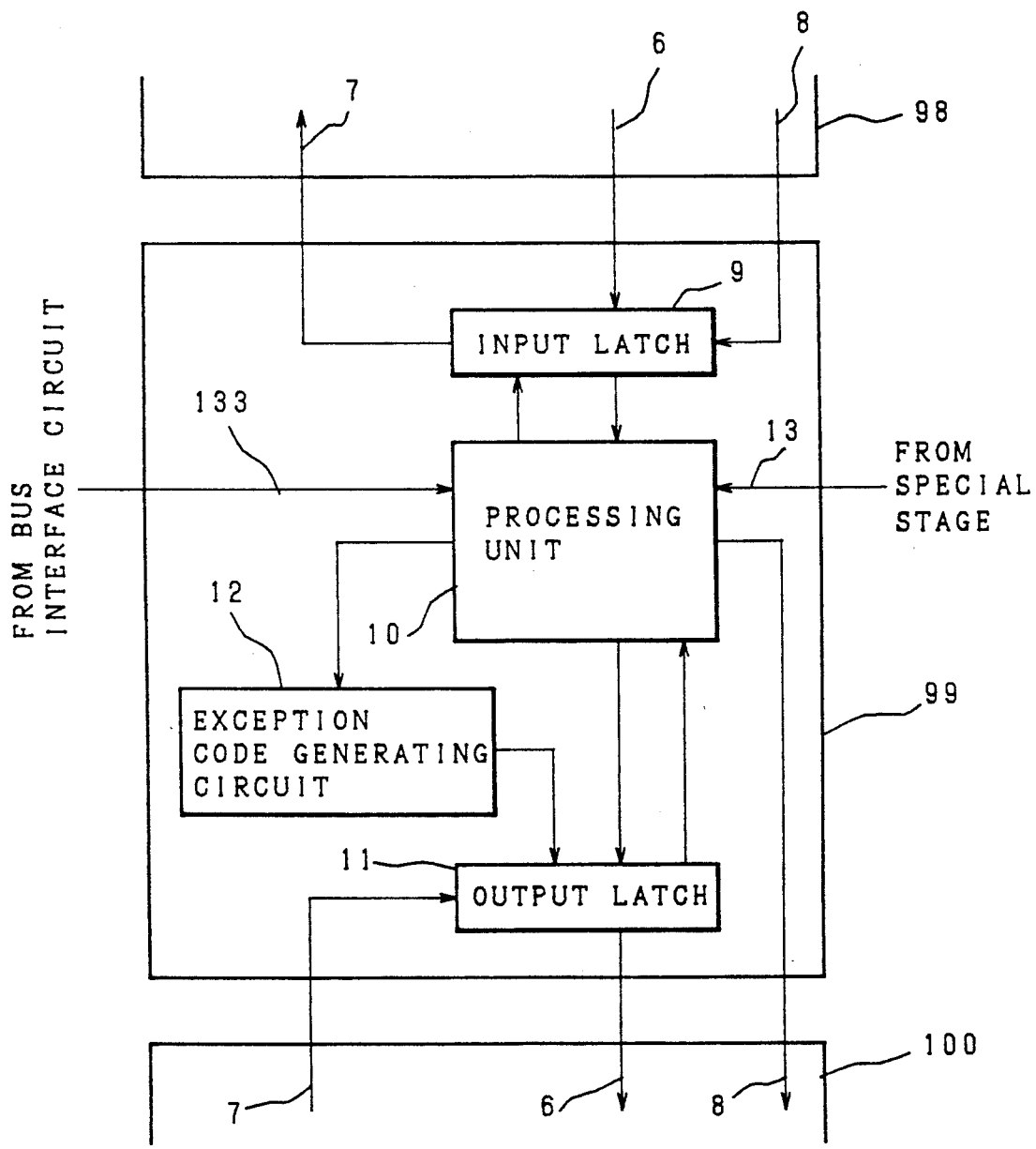
FIG. 3 shows a block diagram of one embodiment of a stage in a pipeline in accordance with the invention.

Referring now to FIG. 3, there is shown a block diagram of a given stage 99 of the pipeline. The given stage includes an input latch 9, an output latch 11, a processing unit 10, and an exception code generating circuit 12. Input latch 9 is latched by the output latch of the preceding stage 98 and has inputs from the processing unit of the preceding stage 98 and the processing unit of the given stage 99. Input latch 9 has outputs to processing unit 10 of the given stage 99 and output latch 11 of the preceding stage 98.

Processing unit 10 has inputs coupled to its own input latch 9 and output latch 11, and to a special stage (not shown) over lines 13. Processing unit 10 has outputs coupled to its own output latch 11 and error code generating circuit 12, and to input latch 9 of the following stage 100.

Exception code generating circuit 12 has an input coupled to its own processing unit 10 and an output coupled to its own output latch 11.

Referring still to FIG. 3, output latch 11 has inputs coupled to its own exception code generating circuit 12 and processing unit 10, and is latched by input latch signal 9 of the succeeding stage 100. Output latch 11 has outputs coupled to its own processing unit 10, and to input latch 9 of the succeeding stage 100.

The operation of the stage shown in FIG. 3 will now be described. To commence operation of the stage shown in FIG. 3, the output latch effective signal 8 is first received from the preceding stage 98 and then input latch 9 outputs the input latch vacancy signal 7, to the preceding stage 98. Vacancy signal 7 latches out the step code 6 from the output latch of the preceding stage 98. Next, the given stage reads the step code 6 from the output latch 11 of the preceding stage 98 and latches it until the processing at the given stage finishes.

A processing unit 10, which performs the processing activity for the given stage is shown. Processing unit 10 could be, for example, an instruction fetch, instruction decode, address calculation, operand fetch and execution, or other processor, depending on the desired processing object to be accomplished. In addition to carrying out normal processing, unit 10 also produces the step code 6, and gives an instruction to an exception code generating circuit 12 to be discussed below, when an exception (hereinafter assumed to be, for example, an error) is generated during processing. Processing unit 10 or exception code generating circuit 12 may also include storage means for storing significant information in the form of step codes—i.e., the prior processing results, prior input step codes, etc.

The output latch 11 latches signals from the processing unit 10 and exception code generating circuit 12 so as to output the step code to the input latch 9 of the following stage.

Referring still to FIG. 3, when the processing unit 10 detects generation of an error, the exception code generating circuit makes up an exception code including data specifying the kind of error generated and the stage thereof. The exception code is input to the output latch 11 which latches the exception code as part of the step code 6.

Additional control signals are generated by the special stage in the pipeline. These control signals are provided from the execute stage 5 to other stages 1 to 4 over lines 13 as shown in FIG. 3. These signals may be provided over a common bus or separate lines. When the exception code generated at the respective stages 1 to 4 is eventually transferred to the execute stage 5 (i.e., the special stage) or the error code is generated in execute stage 5 (as will be discussed hereafter), the processing unit 10 of the special stage 5, in order to cause execution of exception processing, outputs necessary control signals to other stages 1 to 4 over lines 13. Thus, each stage is reset, or not reset, to start execution of the exception processing. In the embodiment shown in FIG. 2, execute stage 5 could retrieve previous processing results from the store stage or from the storage elements in processor 10 or elsewhere and use these to expedite exception processing, although in a simplified arrangement, execute stage 5 merely uses decode results to cause exception processing.

Next, the normal operation of given stage 99, shown in FIG. 3, will be further detailed as follows.

First, the output latch effective signal 8 from the processing unit 10 of the preceding stage 98 is provided to input latch 9 of the given stage 99, in the state where the input latch vacancy signal 7 is output from the input latch 9 of the given stage 99 to the output latch 11 of the preceding stage 98. As a result, the processing unit 10 of the given stage 99 fetches the step code 6 from the output latch 11 of the preceding stage 98 to the input latch 9 of its own stage. The step code 6 from the preceding stage 98 is processed in processing unit 10 of the given stage 99 only when there is a vacancy at the output latch 11 of the given stage 99 so that a new instruction will be processed by the processing unit 10 of the given stage 99 only after the processing result of the preceding instruction 98 has already been fetched by the succeeding stage 100. Processing unit 10 could also operate to store selected input step codes, such as the last input step code, next-to last, etc., depending on the complexity of exception processing desired at stage 99.

Further discussing the operation of the stage of FIG. 3, upon completion of processing by the processing unit 10, the output latch 11 receives the step code 6 from processor 10 and is in a condition of no vacancy.

Simultaneously, the output latch effective signal 8 is given from the processing unit 10 to the input latch 9 of the succeeding stage 100, so that step code 6 can be transferred to the succeeding stage 100.

When the step code 6 is fetched by the succeeding stage 100 from the output latch 11 of the given stage 99, the input latch vacancy signal 7 input to the output latch 11 of the given stage 99 becomes inactive. Hence, the processing unit 10 determines that the step code 6 latched in the output latch 11 of the given stage 99 is fetched by the succeeding stage 100 and creates a vacancy in the input to output latch 11 of the given stage 99 (no step code and exception code inputs from processing unit and exception code generating circuit).

The above operation is repeated by the respective stages, so that the instruction is fetched into the succeeding stages from the first stage instruction fetch stage 1, and is sent to the succeeding stages in the order shown in FIG. 2. As shown in FIG. 2, the store stage may both receive and transfer step codes to the special stage, execute stage 5 therein.

The above discussion summarizes the normal operation of the pipeline of the aforesaid invention and follows the general discussion set forth in corresponding U.S. application, Ser. No. 07/069,320 filed Jul. 2, 1987, now abandoned. It should be understood, however, that the above corresponding application does not teach or suggest the exception processing features disclosed herein, or the use of decoding storage features, means, or stages to perform exception processing.

When an exception such as an error is generated during processing, the processing unit 10 gives the information pertaining to the exception to the exception code generating circuit 12. Thereafter, the exception code generating circuit 12 generates (e.g., encodes) an error code specifying the existence, kind, and stage of the exception and latches the error code at the output latch 11, causing the step code 6 to include the error code. In such an event, the processing unit 10 hinders the input latch 9 from providing the input latch vacancy signal 7; processing unit 10 makes the input latch vacancy signal inactive and the stage will not carry out further processing.

As each stage is successively given the step code containing the exception code from the preceding stage, the step code 6, including the exception code, may be latched directly to the output latch 11 and then transferred to the next stage without processing of the object information in the step code. Upon receipt or generation of an exception code, the processing unit 10 of each stage hinders the input latch 9 from providing the input latch vacancy signal 7, whereby further processing also is not carried out at that stage.

Whenever an exception is generated at the special stage, or an exception processing code is received at the special stage, control signals in the special stage are generated. Further, if an exception is created or received at the store stage, an appropriate exception processing code may be generated therein and transferred to the special stage for exception processing. Control signals are used to reset and/or restart selected stages during or after execution of exception processing and are provided to the processing unit 10 of respective stages 1 through 4 and 50.

Figure 4A:
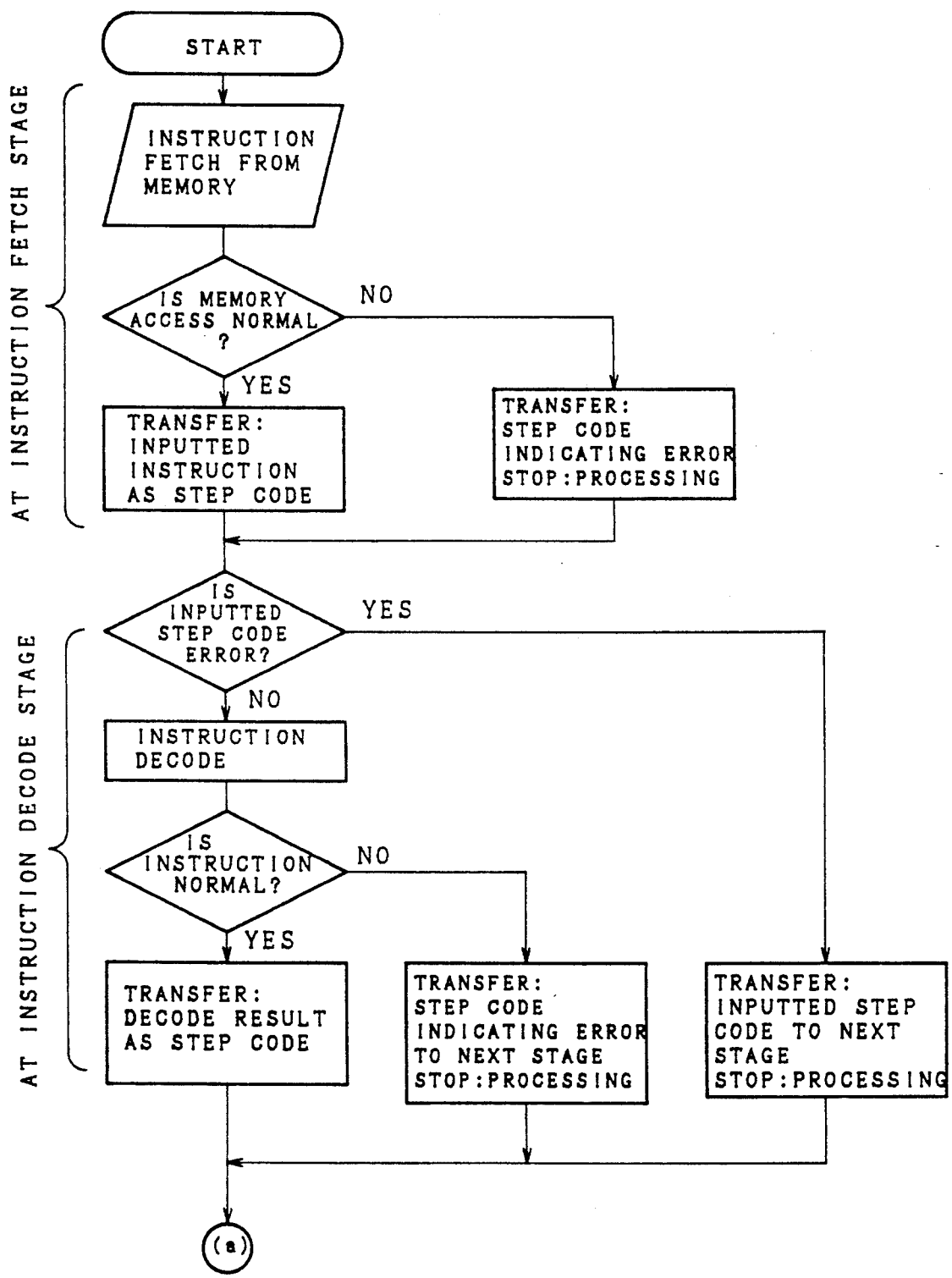
FIGS. 4(a), (b), (c) and (d) show flow charts, explaining operation of one embodiment of a pipeline from stage to stage in accordance with the invention.

Next, the operation of the pipelined microprocessor during exception processing in accordance with the invention, will be described with reference to the FIGS. 4(a), (b) and (c) flow charts for the case where an error is generated. FIGS. 4(a), (b) and (c) comprise a single flow chart which depicts the logical steps of the processing function in the event an exception processing code is transferred to, or generated by, a pipeline stage. FIG. 5 will also be referred to and it illustrates the contents of the step code generated at each stage.

Referring now to FIG. 4, processing starts when an instruction is fetched from an instruction memory (not shown) to the instruction fetch stage. The processing unit of the instruction fetch stage decides whether or not the instruction is normally fetched from the instruction memory and whether a bit error or the like has been generated in the fetched instruction. A step code is generated based on this decision—if memory access is normal, the step code will include the received instruction (and control information if desired). If the instruction is not normal—i.e., an exception (error)—the step code will also include an exception code indicating the presence of an error in the instruction. A step code which includes an exception code is hereafter referred to as an exception processing code.

Referring now to FIG. 5(a), FIG. 5(a) depicts the contents of the step code 6 (exception processing code) generated by the fetch stage. The contents of the step code of FIG. 5(a) includes an exception code, an instruction code, and a control code (control information). In order from the first bit, there is first an exception bit which is one bit, being logical "1" when an exception occurs. The exception bit indicates whether or not an exception code is present in the step code. Next is an exception kind code (four bits) which indicates the kind of exception. Next is the stage code (three bits) which indicates the stage generating the exception. Next occurs a code (sixteen bits) for the fetched instruction. Finally, at the end of the step code, is a control information code (five bits). The first eight bits—exception bit, exception kind code, and stage code—constitute the exception (error) code generated in the exception code generating circuit. This basic pattern for the step code—exception code, processing code, control code—is repeated for step codes generated at succeeding stages. It should be clear, however, that the step code can include other useful information to enhance exception processing such as memory information, previous instructions, previous calculations, etc., depending on the complexity of the exception code generating circuit, the processing unit, and the special stage.

As previously explained for FIG. 3, when an exception is generated or received at the instruction fetch stage, the processing unit thereby decides the kind of exception, and forwards error information to the exception code generating circuit. The processing result of the step code and the control information (but not the error code), are coupled to the output latch from the processor and latched thereby; thereafter the processor makes the input latch signal inactive from the input latch. As a result, the processing unit for the stage is placed in non-operating condition and temporarily stops the instruction fetch stage from processing new instructions.

Referring still to FIG. 4, meanwhile, the exception code generating circuit makes the exception bit a logical "1" and generates a complete exception code of eight bits, including the information as to the kind of exception and stage generating the exception. Thereafter, the exception code generating circuit gives the exception code to the output latch to be latched thereby. Hence, the entire output latch will latch thereby the entire step code (exception processing code), including the exception (error) code, the instruction code, and control information of the instruction fetch stage. It should be understood that an exception can occur at a stage for a number of reasons, including when the input to the stage is an error or other exception. In such a case, if the input code is not an exception processing code, an exception processing code will also be generated.

Upon latching the step code in the output latch, the processing unit of the instruction fetch stage gives the output latch effective signal to the input latch of the next instruction decode stage.

The instruction decode stage, the next stage, gives the input latch vacancy signal to the output latch of the preceding instruction fetch stage. As a result, the step code, which is latched at the output latch of the instruction decode stage, is latched to the input latch of the instruction decode stage.

Referring again to FIG. 4, at the instruction decode stage 2, the processing unit first examines the exception code in the step code received from the instruction fetch stage. When the instruction fetch stage has generated an exception bit that is logical "1" (instruction not normal), the step code 6 introduced from the instruction fetch stage 1 is given directly to the output latch of the decode stage and latched thereby. Simultaneously, the input latch vacancy signal for the decode stage is made inactive to temporarily stop subsequent processing at the decode stage.

In a case where the exception bit is not logical "1" (instruction normal), the processing unit of the instruction decode stage 2 decides whether or not the instruction code in the step code 6 given from the instruction fetch stage 1 is normal, and if not, gives the exception code generating circuit 12 the abnormal instruction as error information; thereafter, the decode processor stops the operation of the decode processing unit in substantially the same manner as done by the fetch processor above mentioned for the fetch stage.

Alternatively, when the instruction (the processing result) is normal, the processing unit of the instruction decode stage executes its essential processing in accordance with the step code control information. As a result, address information and instruction information are obtained, and the processing unit of the instruction decode stage gives to its output latch this information and the control information for the next stage as part of the step code 6 shown in FIG. 5(b). The step code is then latched in the output latch 11. However, when an exception—i.e., an error, is generated during processing at the instruction decode stage, the decode processor inactivates the input latch to stop processing for the decode stage and gives the exception code generating circuit the error information. The exception code is generated in substantially the same manner as above-mentioned for the fetch stage. The resulting step code of FIG. 5(b) is latched to the output latch for the decode stage. As shown in FIG. 5(b), eight exception code bits are included in the resulting step code.

Figure 4B:
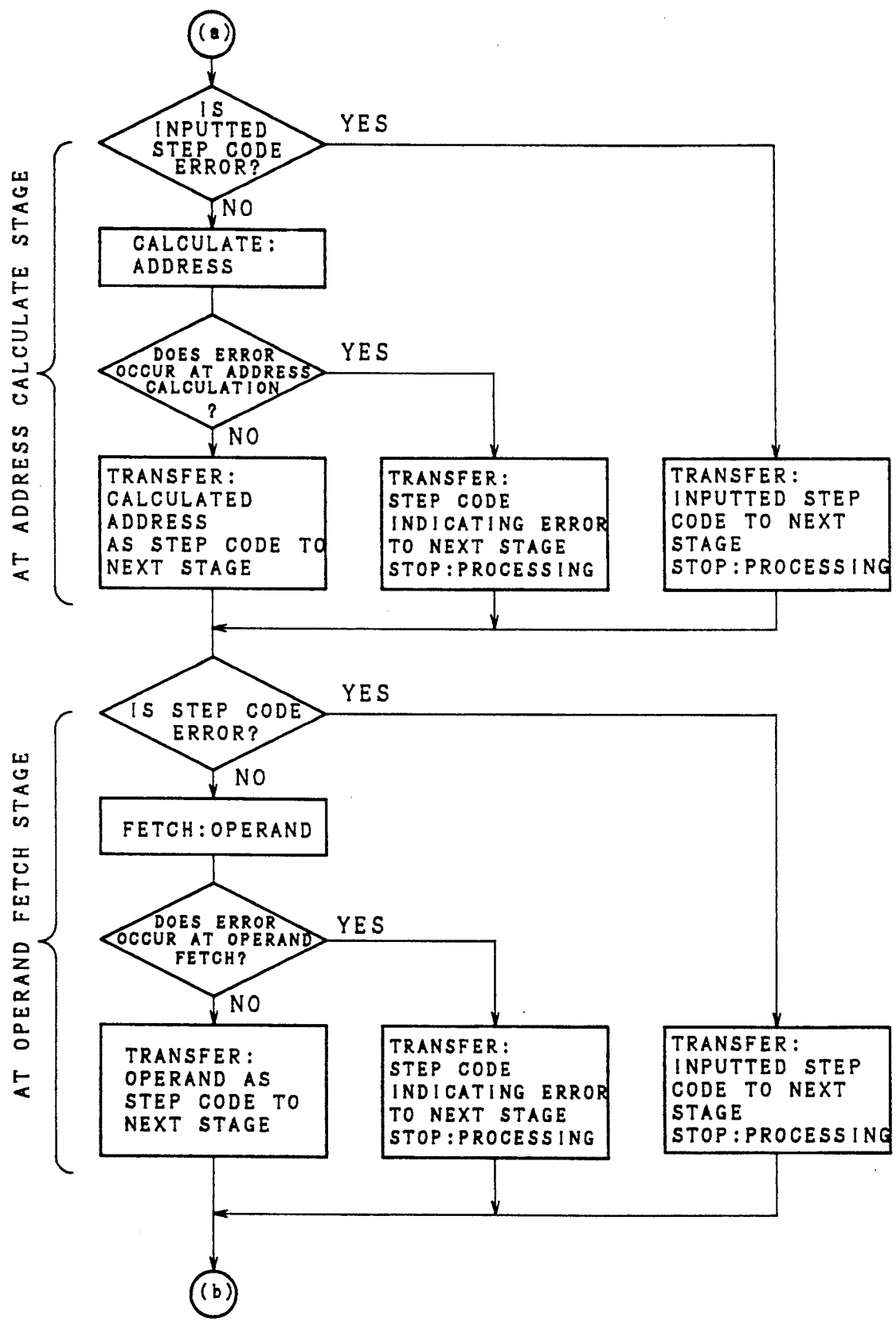

Referring now to FIG. 4(b), there is shown the logic flow for the address calculating stage, the third stage. The processing unit at this stage repeats the logic of the earlier stages. That is, if the input is an error, the input is given directly to the output latch and latched thereby. If the input is normal, operand fetch information (operand address) is generated on the basis of the address information obtained from the decode stage step code and the microprogram address is generated from the instruction information. These two strings of address codes are part of the step code 6 of FIG. 5(c) to be given by the address stage to the next operand fetch stage. An error decision is made for these two strings of code and an exception code is generated by an encoder the same as for the preceding stages if an error exists.

Referring still to FIG. 4(b), there is shown the logic flow for the operand fetch stage. The logic flow at this stage is essentially the same as for the previous stages. At the operand fetch stage, the fourth stage, operand information is read in accordance with the operand information given from the address calculating stage 3, and the microprogram is read in accordance with the microprogram address from each memory (not shown). If an exception—i.e., an error is detected or generated, an error code is generated and latching occurs as in the aforesaid respective stages. In addition, normal processing and resulting latching proceed in essentially the same way as for the preceding stage.

Figure 4C:
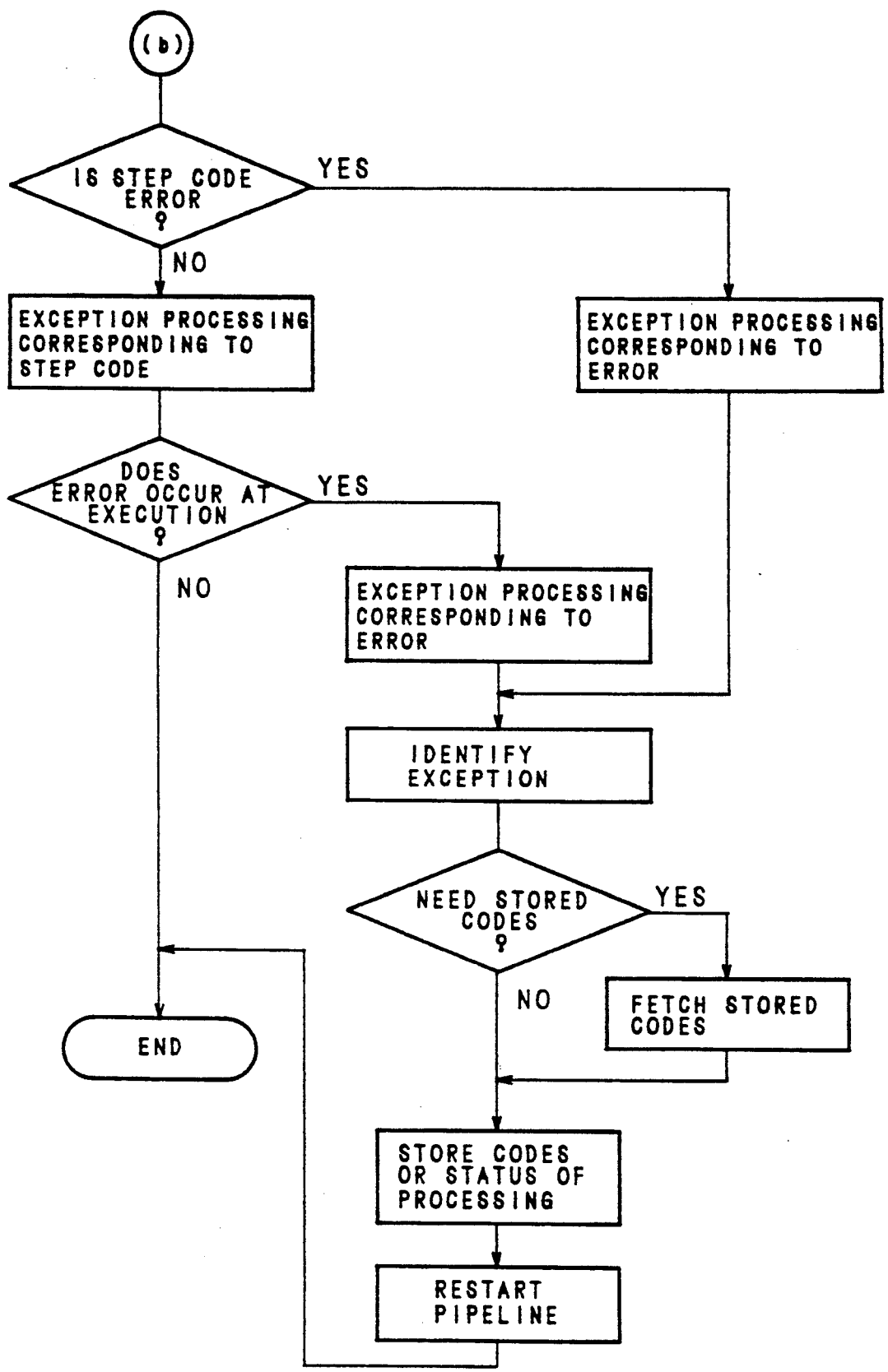
Figure 4D:
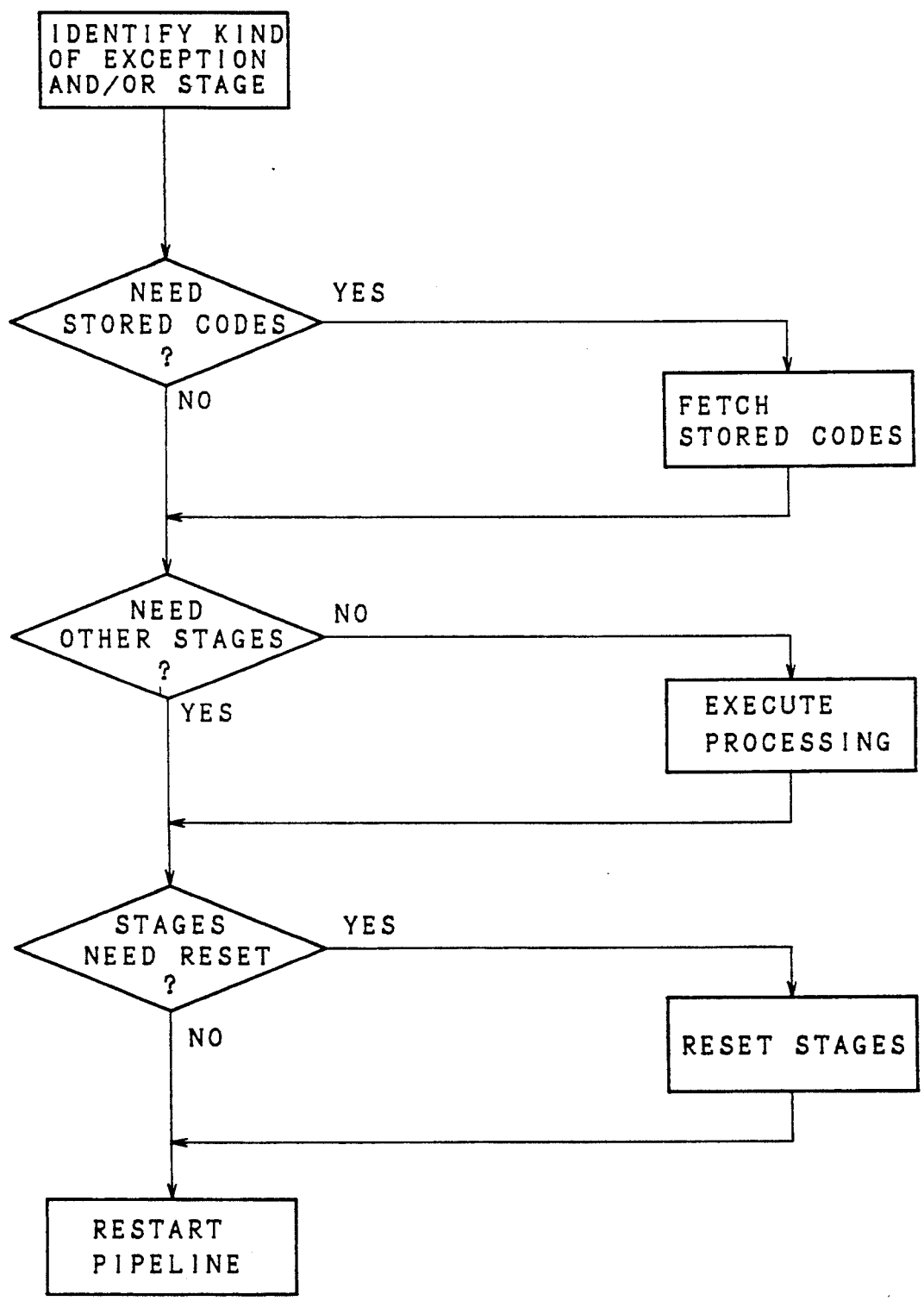

Referring now to FIG. 4(c), there is shown the logic flow for the last stage in one embodiment, the execute stage, which is also the special stage where the exception processing code is decoded. One of the step codes, shown in FIGS. 5(a)-5(d), will arrive from the operand fetch stage 4 to the execute stage. If the exception bit is a logical "1", an exception is indicated. The step code may also specify the kind of exception and stage generating the exception. Execute stage 5 then decodes the exception code, and causes execution of exception processing corresponding to the information in the exception processing code, initializing the pipeline and restarting processing depending on the nature of the exception and the stage generating the exception.

For example, when the exception is generation of bit error in the instruction fetch stage, the execute stage, via a control signal to the processor of instruction fetch stage 1, causes the instruction to be refetched from the instruction memory or the storage stage to the first instruction fetch stage, and thereafter the respective stages 1 to 5 are reset to reexecute the normal pipelining. This action is accomplished according to the invention without using an external control circuit to entirely control exception processing. When the generated exception is, for example, a branch instruction, the branch instruction itself will reach the processing unit. When the branch condition is thus established, the instruction for branch destination address is read from the instruction memory to the instruction fetch stage, thereby executing branch processing. In addition, other information may be retrieved from the storage stage, fetched into other stages and processing reinitiated without reexecuting unnecessary processing or using the external control circuit for control of every step of exception processing.

As seen from the above, even when an exception, such as an error, is generated during pipelining, effective processing is continued ahead of the error up to the last execute stage. After the exception processing code reaches the exception decode (execute) stage, the respective stages are controlled based on the relevant exception information as embodied in the step code, thereby enabling easy coping with an increased number of stages of the pipeline. For example, assume that the pipeline is one for calculation and has 20 stages. Assume further that an error occurs at stage 15. In the prior art circuit of FIG. 1, the processing at stages 16–20 would be completed sequentially but all processing at stages 1–14 would be automatically cancelled. According to applicant's invention, stages 1–15 would temporarily stop processing. Stage 15 would have forwarded an exception processing code to special stage 19. Special stage 19 would examine the code and determine the kind of error and the stage generating the error.

Further, assume that the error is a probable one time error, i.e., transient erroneous output from stage 14, which causes generation of an exception processing code at stage 15. Stage 19 would decode the exception processing code to determine the kind of error (one time) and stage (15) generating the exception. Stage 19 would then furnish control signals to the processing units in the stage generating the exception and then restart the pipeline. Alternatively, stage 19 could provide a new processing code to stage 15 using the decode results or could derive a new step code using the decode results either alone or in combination with stored codes from store stage 20 or other storage means, and then provide the new code to stage 15. Stage 19 would then cause the latches in the stopped stages to be reset by the processing units in each stage, and then restart all the stages in the pipeline to continue processing.

Other exception processing scenarios are possible using exception processing codes, the special stage and stored codes according to the invention. For example, in the previous example, the decoder at stage 19 and/or the store stage 20 could simply prestore predetermined control signals, codes, and execution results that should be furnished to the stages or as the execution stage output given the kind of exception and the identity of the stage generating the exception. Store stage 20 could also store previous processing results from all processing stages, allowing stage 19 to reload stages, reset the stages, and then restart processing in another embodiment.

Additionally for the foregoing example, when stage 15 generates an exception processing code, it will temporarily stop accepting new inputs to its input latch. Stage 14 could under such conditions refetch from its own memory or from storage stage 20, its next to last previous input. This input could be reprocessed at stage 14 and relatched into stage 15. Stage 15 could then send a "clear" signal over control bus 13 to special stage 19, causing stage 19 to ignore a subsequently received exception processing code from stage 15. It is thus possible using this scenario to efficiently use the stopped stages as preceding processing continues, while not complicating the involvement of the special stage until the exception processing code is finally delivered to stage 19. When the exception processing code is finally delivered, stage 19 could ignore it if a clear signal has already been received from stage 15. If not, then another exception processing scenario could be pursued.

Figure 1:
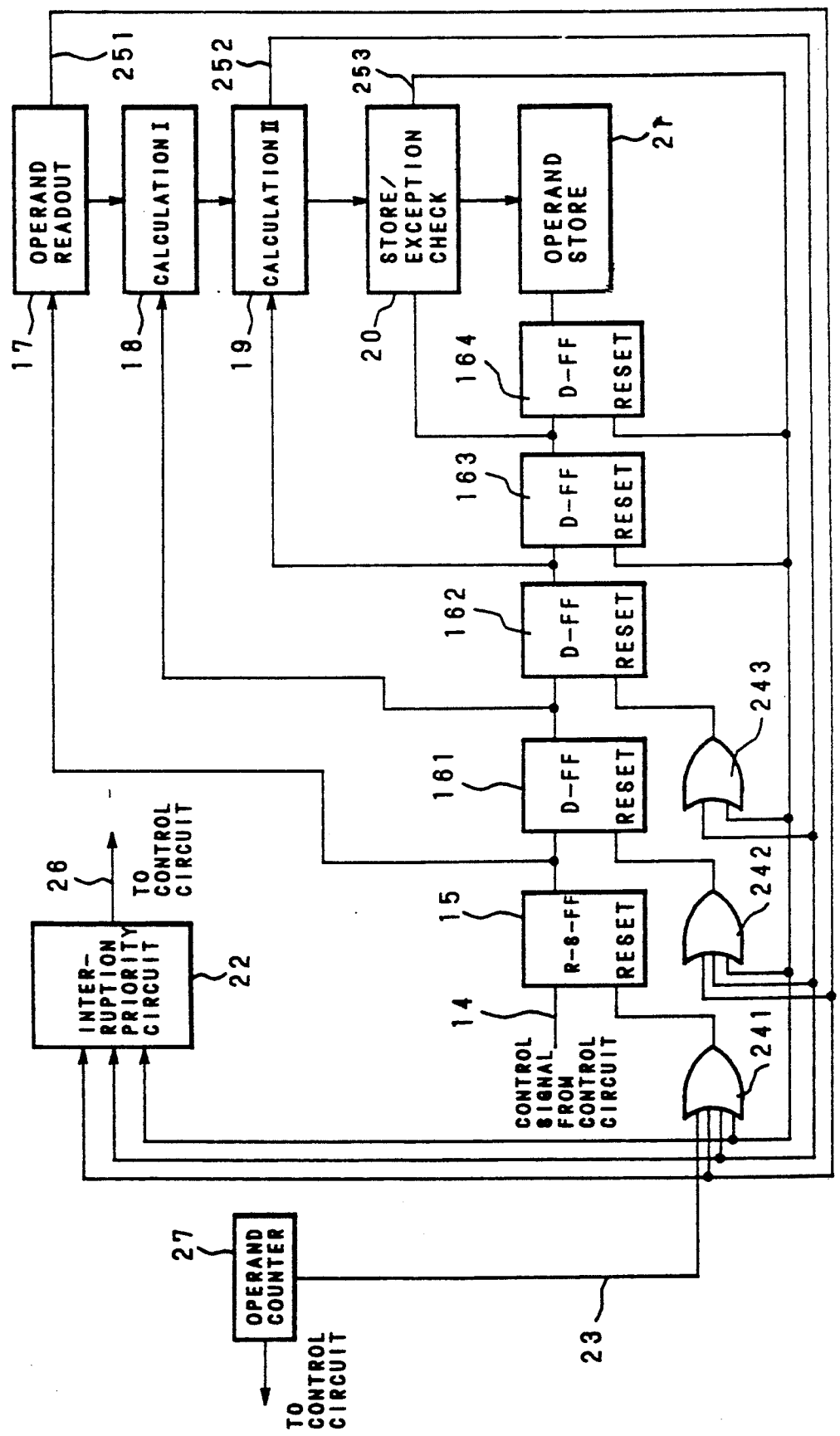
FIG. 1 is an illustration of the prior art which has been previously discussed.

Since no processing has automatically been canceled in accordance with the invention as in the prior art pipeline of FIG. 1, the execute stage is able, after isolation of the error, to direct appropriate exception processing with a minimum of wasted processing. Further, as the number of stages increases, the shorter time that it takes to directly fetch the error to the special stage without performing intervening erroneous processing becomes increasingly advantageous. It can also be seen that the pipeline can be configured to incorporate a plurality of special stages so located as to optimize exception processing time where the number of stages in the pipeline becomes significant.

Figures 6A, 6B:
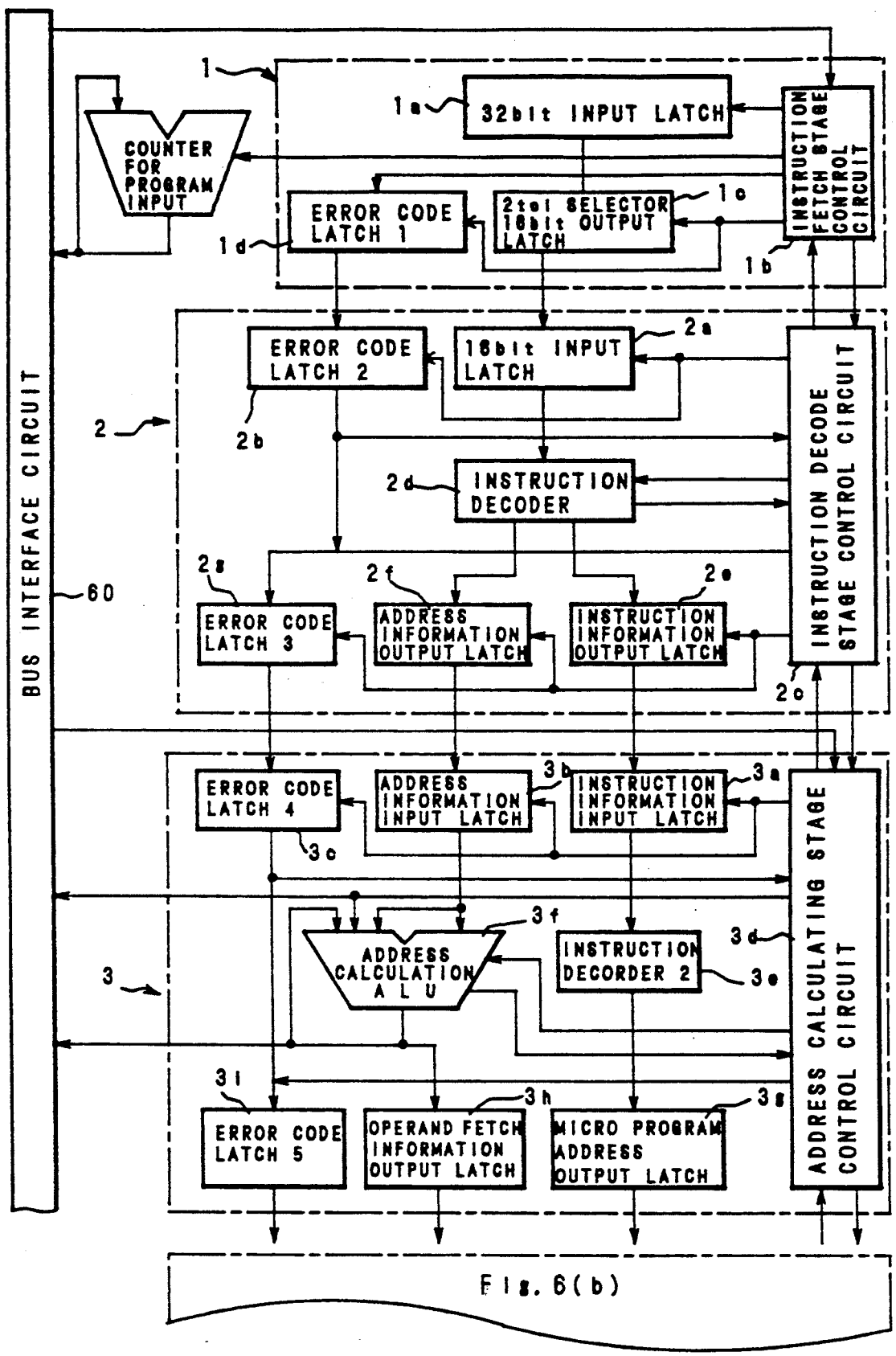
FIGS. 6(a) and (b) show a detailed block diagram of an embodiment of the invention.

FIGS. 6(a) and (b) are block diagrams showing one embodiment of a pipelined microprocessor in accordance with the invention.

In FIGS. 6(a) and 6(b), reference numerals 1 through 5 correspond respectively to the fetch stage, instruction decode stage, address calculating stage, operand fetch stage, and execute stage in FIG. 1 respectively.

Referring now to FIG. 6(a), in the instruction fetch stage 1, there is shown a 32 bit input latch 1a for fetching an instruction from a bus interface circuit 60. An instruction fetch stage control circuit 1b functions as the processing unit. Although detection of the exception processing code may be performed by the control circuit for each stage, the bus interface circuit may generate exception processing codes as is the case for stage 1. A 16 bit output latch 1c and error code latch 1d, function as the output latch.

Referring again to FIG. 6(a), the instruction decode stage 2 includes a 16 bit input latch 2a and an error code latch 2b which function as an input latch for fetching the step code from the instruction fetch stage. An instruction decode stage control circuit 2c (including the exception code generating circuit 12) and an instruction decoder 2d act as the processing unit. An instruction information output latch 2e, an address information output latch 2f, and an error code latch 2g, function as the output latch.

Referring again to FIG. 6(a), the address calculating stage includes an instruction information input latch 3a, an address information input latch 3b, and an error code latch 3c which function as an input latch for fetching the step code from the decode stage. An address calculating stage control circuit 3d (including the exception code generating circuit), an instruction decoder 3e, and address calculation ALU 3f act as the processor. A microprogram address output latch 3g, an operand fetch information output latch 3f, and an error code latch 3i function as the output latch. For this stage, the exception code may be generated by the bus interface circuit 60 in the embodiment in FIG. 6(a).

Referring now to FIG. 6(b), the operand fetch stage 4 includes a microprogram address input latch 4a, an operand fetch information input latch 4b, and an error code latch 4c, which function as the input latch for fetching the step code 6 from the address calculating stage 3. An operand fetch stage control circuit 4d (including the exception code generating circuit 12), an immediate data register 4e, a microprogram memory 4f, and an operand data register 4g function as the processor. An error code latch 4h and microprogram stage (memory) 4h function as the output latch. The bus interface circuit 60 may also generate the exception processing code for this stage in the embodiment in FIG. 6(a).

The execute stage 5 includes an execute stage control circuit 5a which operates as the input latch and processing unit for fetching the microprogram from the operand fetch stage 4. A group of registers 5b act as the input latch 9 for the operand data, and an ALU 5c as the processing unit for the operand data.

Also shown in FIG. 6(b) is store stage 50, comprising a store unit 50a for storing processing codes and a store control circuit 50d for controlling inputs and outputs to store stage 50. Store unit 50a is also coupled to execute stage 5 and may provide step codes to execute stage 5 during exception processing.

Figure 7:
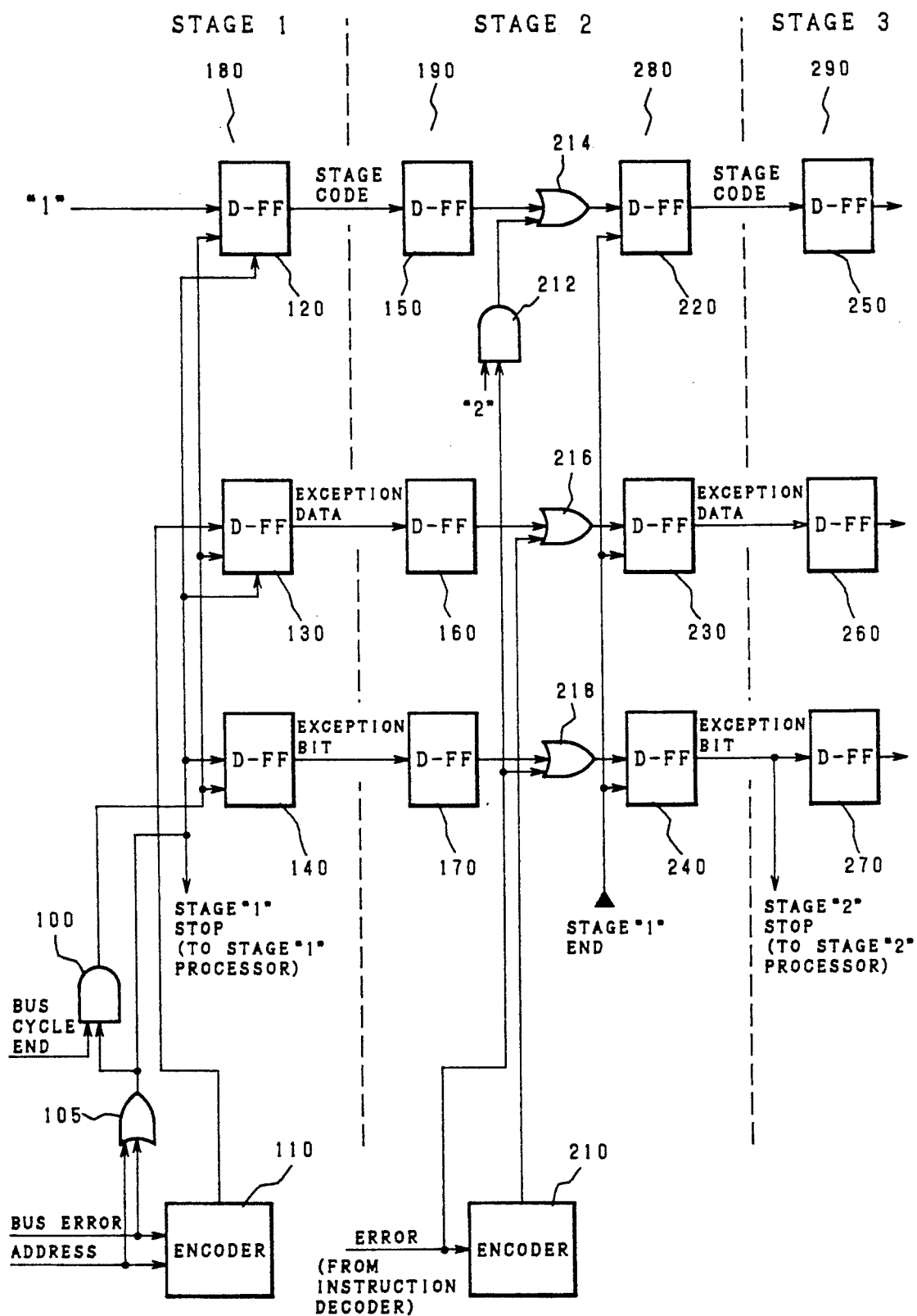
FIG. 7 is a block diagram of exception code latches and generating circuits for three pipeline stages in accordance with one embodiment of the invention.

Refer now to FIG. 7. FIG. 7 shows three microprocessor stages having exception processing features in accordance with one embodiment of the invention. Shown in FIG. 7 are the exception code generating circuits and the input and output latches for the exception codes for the stage 1 instruction fetch stage, the stage 2 instruction decode stage and the stage 3 address calculation stage.

FIG. 7 will now be explained to clarify how the exception code (data) portion of the exception processing code is generated, transferred and received by stages 1, 2, and 3.

FIG. 7 shows an exception code output latch 180 for the instruction fetch stage. The output latch 180 provides an exception code from the instruction fetch stage. For the embodiment shown in FIG. 7, the exception code consists of 9 bits which includes one exception bit, 4 exception data bits, and 4 bits indicating the stage generating the exception code. The output latch 180 for stage 1 includes 3 D flip-flops 120, 130 and 140. Also shown in FIG. 7 is input latch 190 for stage 2, the instruction decode stage. The input latch 190 includes D flip-flops 150, 160 and 170. Likewise shown is output latch 280 for the instruction decode stage which includes 3 flip-flops 220, 230 and 240. The next latch, input latch 290 for stage 3, includes D flip-flops 250, 260 and 270.

D flip-flops 120, 150, 220, and 250 process the stage code. D flip-flops 130, 160, 230 and 260 process the exception data. D flip-flops 140, 170, 240 and 270 process the exception bit.

A digital representation of "1" is coupled from a microprogram to a data input of D flip-flop 120 to indicate the stage code at stage 1.

A bus error signal from a bus interface circuit is coupled to an input to OR gate 105. An address translation signal is coupled to another input to OR gate 105. The output of OR gate 105 is coupled to the data input of flip-flop 140 to indicate the presence of an error. The output of OR gate 105 is also used as a stage 1 stop signal for the stage 1 processor. The output of OR gate 105 is also coupled to the reset inputs of flip-flops 130 and 140.

The bus error signal and the address translation signal are also coupled to inputs to an encoder 110. The output of encoder 110 is coupled to a data input of D flip-flop 130 to represent the exception data.

A bus cycle end signal is coupled to one input of AND gate 100. The output of OR gate 105 is coupled to another input to AND gate 100. The output of AND gate 100 is coupled to the clock signal inputs for D flip-flops 120, 130 and 140.

The 4 bit stage code output of D flip-flop 120 is coupled to the data input of D flip-flop 150. The 4 bit exception data output of D flip-flop 130 is coupled to the data input of D flip-flop 160 and the one exception-bit from the output of D flip-flop 140 is coupled to the data input of D flip-flop 170.

A D stage step lock signal is coupled to the clock inputs of D flip-flops 150, 160 and 170.

Stage 2 includes an encoder 210 that receives an error code input from an instruction decoder (not shown) included in stage 2. The error input is also coupled to one input of AND gate 212. A digital representation of "2" from a microprogram is coupled to another input to AND gate 212. The output of AND gate 212 is coupled one input of OR gate 214. The output of D flip-flop 150, which represents the stage code from stage 1, is coupled to another input of OR gate 214.

The output of encoder 210 is coupled to an input to OR gate 216. The output of D flip-flop 160 is also coupled to another input to OR gate 216.

The error input from the stage 2 instruction decoder is also coupled to an input of OR gate 218. The output of D flip-flop 170 is coupled to another input to OR gate 218.

The output of OR gates 214, 216 and 218 are respectively coupled to inputs of the D flip-flops in output latch 280 for stage 2. The output of OR gate 214 is coupled to the data input of D flip-flop 220. The output of OR gate 216 is coupled to the data input of D flip-flop 230. The output of OR gate 218 is coupled to the data input of D flip-flop 240. D flip-flops 220, 230 and 240 receive a stage 1 end signal at their respective clock inputs that indicates the end of stage 1 processing. The output of D flip-flop 220 comprises 4 bits representative of the stage generating the exception code. The output of D flip-flop 230 comprises 4 bits of exception data. The output of D flip-flop 240 comprises one exception bit.

The output of D flip-flop 220 is coupled to a data input to D flip-flop 250. The output of D flip-flop 230 is likewise coupled to a data input to D flip-flop 260. The output of D flip-flop 240 is coupled to a data input to D flip-flop 270. The exception bit output from D flip-flop 240 is used as a stage 2 stop signal which is coupled to the stage 2 instruction decoder (not shown).

Next, the operation of the circuit shown in FIG. 7 will be discussed. In actual operation, when a bus interface circuit detects the occurrence of a bus error, a bus error code will be coupled to an input to encoder 110. Encoder 110 will generate 4 exception bits which are provided to the data input of D flip-flop 130 and which represent the kind of exception. The error code coupled to an input of D flip-flop 140 causes an exception bit output from D flip-flop 140 which indicates whether or not an exception is present at stage 1.

The error code and a bus cycle end signal are coupled through AND gate 100 to provide a clock signal to D flip-flops 120, 130 and 140.

Thus, upon receipt of an error code at stage 1, a 9 bit exception processing code is coupled from the input latch 180 to the output latch 190. The output of OR gate 105 would stop processing at stage 1. The decode stage step lock signal, coupled to the clock inputs for flip-flops 150, 160, and 170 would cause the 9 bit exception code to be transferred to the OR gates coupled to the input of output latch 280 for stage 2.

Upon receipt of a stage 1 end signal at the clock input for D flip-flops 220, 230 and 240, D flip-flops 220,230 and 240 would transfer the 9 bit exception code to the input latch for stage 3.

The exception bit coupled from D flip-flop 240 stops processing at stage 2.

Subsequently, exception codes would be coupled from the output of one stage to the input of the following stage in a similar manner.

OR gates 214, 216 and 218 are coupled to the input of the output latches for stage 2 in order to provide for the alternative situation wherein an exception occurs during processing at stage 2 and no exception code was received from the output latch of stage 1. In such an event, the 4 bit stage code would be provided from AND gate 212 to an input to OR gate 214. Exception data would be provided from encoder 210 to an input to OR gate 216 and the error code from the instruction decoder at stage 2 would be provided to an input to OR gate 218. The exception code would then be latched from latch 280 to latch 290 as previously discussed in the case of an exception code received from stage 1.

Figure 8:
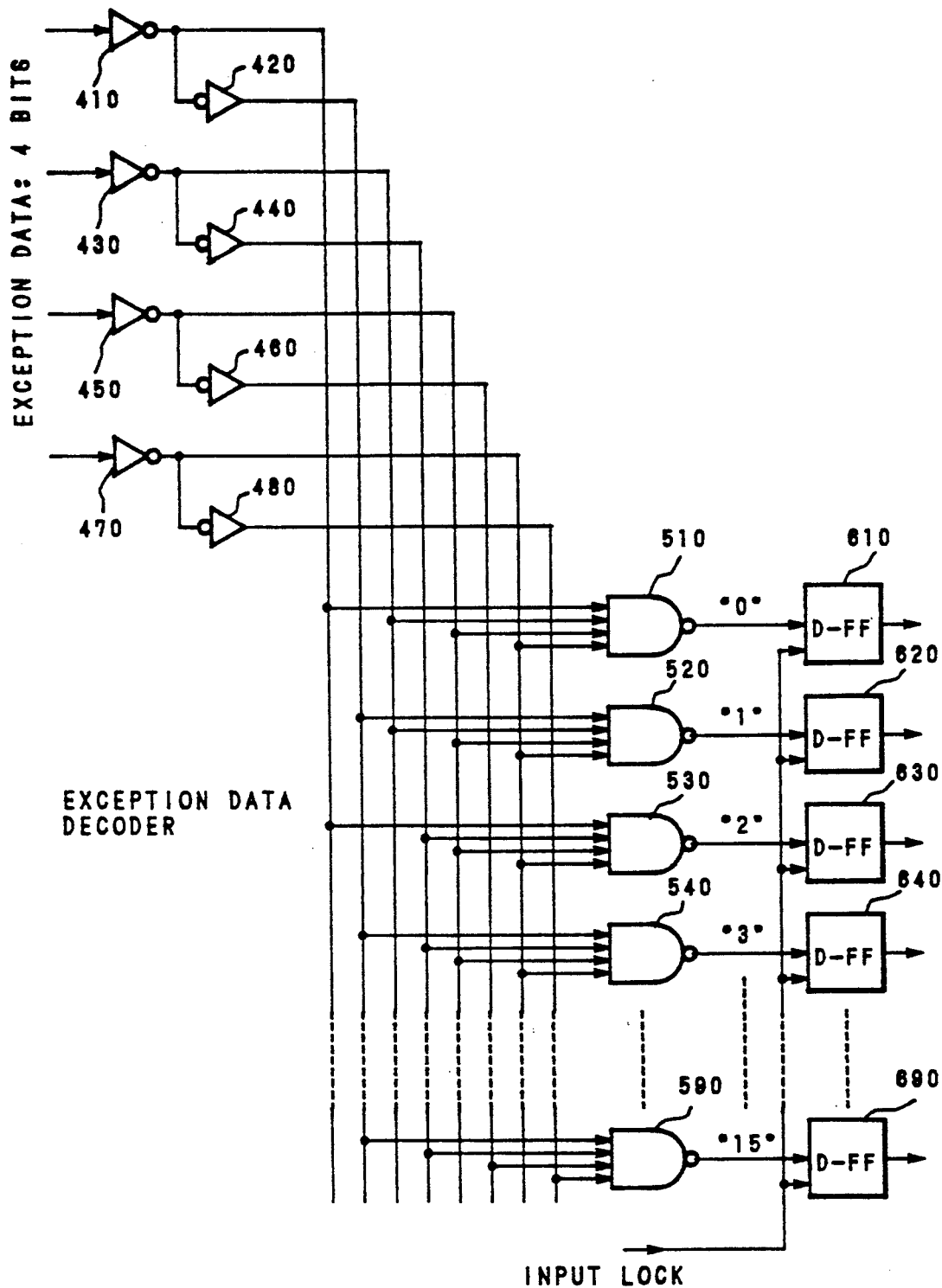
FIG. 8 is a block diagram of an exception code decoder in accordance with one embodiment of the invention.

Refer now to FIG. 8. FIG. 8 shows a block diagram of an exception code (data) decoder included for example in the special stage in a microprocessor in accordance with the invention. In the example shown in FIG. 8 the exception data consists of 4 digital bits which represent 16 possible kinds of exceptions. The encoder shown in FIG. 8 decodes the exception data to provide an address to a microprogram which may be located at the special stage for execution of exception processing based on the exception data input. As shown in FIG. 8, the exception data is initially coupled to a plurality of inverters.

One bit is coupled to inverter 410, one bit is coupled to inverter 430, one bit is coupled to inverter 450 and another bit is coupled to inverter 470. The output of inverter 410 is coupled to the input of inverter 420. The output of inverter 430 is coupled to the input of inverter 440. The output of inverter 450 is coupled to the input of inverter 460. The output of inverter 470 is coupled to the input of inverter 480.

Output lines from inverters 410, 420, 430, 440, 450, 460, 470 and 480 form a plurality of bus lines 499 which are selectively coupled to a plurality of NAND gates 510 through 590 representative of the 16 possible exceptions represented by the 4 digital bits. In the example in FIG. 8, 16 NAND gates would be provided in total although only 5 NAND gates are shown for illustration. The output of inverters 410, 430, 450 and 470 are coupled to inputs to NAND gate 510. The output of inverters 420, 430, 450 and 470 are coupled to inputs to NAND gate 520. The outputs to inverters 410, 440, 450 and 470 are coupled to the inputs to NAND gate 530. The output of inverters 420, 440, 450 and 470 are coupled to the inputs of NAND gate 540 and the outputs of inverters 420, 440, 460 and 480 are coupled to inputs to NAND gate 590.

The output of each NAND gate is coupled to a corresponding D flip-flop. The output of NAND gate 510 is coupled to a data input to D flip-flop 610. The output of NAND gate 520 is coupled to data input to D flip-flop 620. Output of NAND gate 530 is coupled to a data input to D flip-flop 630. The output of NAND gate 540 is coupled to a data input to D flip-flop 640 and the output of NAND gate 590 is coupled to the data input to D flip-flop 690. It should be understood that 16 NAND gates would be coupled to 16 D flip-flops for the embodiment in FIG. 8 although only 5 coupling arrangements are shown for illustration.

D flip-flops 610, 620, 630, 640, etc., and 690 are activated by a clock signal from an input lock. The outputs from D flip-flops 610 through 690 provide addresses to a microprogram for each of the 16 different exceptions.

In actual operation, the decoder shown in FIG. 8 would be provided with an exception data code consisting of 4 bits. When the exception processing code is introduced at the special stage, if the exception bit is a logical "1", the exception data is decoded to decide the entry address of a microprocessor. The executed microprogram depends on the kind of exception and provides the stage information and register values to start the pipeline. The processing condition, such as the program working stack or program counter value and the information as to the exception are carried on a stack in preparation for exception processing. Upon completion of exception processing, the pipeline is restarted to continue normal processing. For the embodiments described in FIGS. 6(a) and 6(b), once a branch instruction is executed, the temporary registers and the ALU are erased. It can be seen that each of the 16 possible combinations of the 4 bit exception data will cause a corresponding program to be executed by the microprogram.

In the aforesaid embodiment, the pipelining is applied to instruction processing, but it may also, of course, be applied to calculation processing. Also other combinations and variations may be utilized, depending on the number of stages and the order of arrangement. For example, it is possible to add a store stage after the execute stage in the pipeline for storing previous step codes received by the execute stage. Step codes could then be retrieved from the store stage and used for exception processing when the exception decode stage causes exception processing. The number of step codes stored could be chosen to equal the number of stages in the pipeline times a certain "look-back" number in order to minimize circuit complexity. Then, when executing exception processing, the prior step codes, containing prior processing results, could be loaded into the appropriate stages for reexecution of processing. Alternatively, each stage could include simple memory means from which previous inputs could be retrieved during execution of exception processing.

Furthermore, in the aforesaid embodiment, it can be seen that step codes are generated at a given stage of the pipeline and transferred to the next stage. Thus, if desired, the next stage may be independently controlled on the basis of the step code 6 generated by the given stage. For example, selected stages may be provided with limited exception processing features such as an exception decoder and corresponding microprograms, along with their normal processing features. Also, the special stage need not be the last stage or near the end of the pipeline and more than one special stage may be used. It is of course possible to add exception processing code generating means to the respective stages of the pipeline of the conventional microprocessor having the general pipelining function shown in FIG. 1, thereby incorporating the exception processing features which characterize the present invention.

As should be apparent from the above, the microprocessor of the present invention need not, when an exception is generated during pipelining, specify the kind of exception and the stage generating the exception. In addition, the conventional external circuit for interrupting or restarting the pipeline in order to reexecute processing may be eliminated, or substantially reduced, thus simplifying the circuitry.

Since the exception information, when generated, is transferred sequentially between the adjacent stages, the hardware and software used to implement the pipelined microprocessor of the invention can easily cope with a change in the number of stages. Incorporation of the exception processing means within each stage also reduces the delay time resulting from responding to error information.

It should be further understood that the term "exception processing code" as used herein refers to the step code generated by a stage in response to the occurrence of an exception.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. In a processor of the type having a pipeline formed by a plurality of consecutive processing stages, each stage having an input means for receiving an input code, a processing means for processing the input code, and an output means for providing an output code to a subsequent processing stage, a method for processing an exception, comprising the steps of:

conveying information pertaining to an exception occurring at a given stage from the processing means of said given stage to an exception code generating means coupled thereto;

generating an exception code at said given stage via said exception code generating means to indicate occurrence of the exception at said given stage;

transferring said exception code to succeeding stages until said exception code is transferred to a special stage;

suspending further processing at said given stage after said exception code is generated and transferred until an initiation of exception processing;

decoding said exception code at said special stage; and initiating, at said special stage, an exception processing sequence by said pipeline when said exception code is decoded at said special stage.

2. The method of claim 1 further comprising the step of suspending further processing at each succeeding stage after said exception code is transferred to each subsequent stage.

3. The method of claim 2 wherein the step of suspending further processing at each succeeding stage comprises inactivating an input latch of said input means of each said succeeding stage, inhibiting receipt of said input code and thereby disabling further processing of each processing unit of said succeeding stages.

4. The method of claim 1 wherein the step of suspending further processing at said given stage comprises inactivating an input latch of said input means of the given stage, inhibiting receipt of said input code and thereby disabling further processing of said processing unit.

5. The method of claim 1 wherein said processor processes instructions.

6. The method of claim 1 wherein said processor processes calculations.

7. The method of claim 1 wherein said exception is a branch instruction.

8. The method of claim 1 wherein said exception is an error.

9. In a processor of the type having a pipeline formed by a plurality of consecutive processing stages, each stage having an input means for receiving an input code, a processing means for processing the input code, and an output means for providing an output code to a subsequent processing stage, a method for processing an exception, comprising the steps of:

conveying information pertaining to an exception occurring at a given stage from the processing means of said given stage to an exception code generating means coupled thereto;

generating an exception code at said given stage via said exception code generating means to signal occurrence of the exception, a kind of exception, and identification of said given stage;

combining said exception code with output from the processing means to form an exception processing code;

transferring said exception processing code to succeeding stages until said exception processing code is transferred to a special stage;

suspending further processing at said given stage after said exception processing code is generated and transferred until an initiation of exception processing;

decoding said exception processing code at said special stage to identify a particular exception processing sequence specific to the exception and said given stage; and initiating, at said special stage, said particular processing sequence when said exception processing code is decoded at said special stage.

10. The method of claim 9 wherein said exception processing code further includes processing information.

11. The method of claim 9 wherein said exception processing code further includes information to control processing at a succeeding stage.

12. The method of claim 9 wherein the initiating step comprises the following steps of:

resetting selected stages of the pipeline, and thereafter restarting normal processing for the pipeline.

13. In a processor of the type having a pipeline formed by a plurality of consecutive processing stages, each stage having an input means for receiving an input code, a processing means for processing the input code, and an output means for providing an output code to a subsequent processing stage, a method for processing an exception, comprising the steps of:

storing information in means for storing coupled to said pipeline to provide stored information;

conveying information pertaining to an exception occurring at a given stage from the processing means of said given stage to an exception code generating means coupled thereto;

generating an exception code at said given stage via said exception code generating means to indicate occurrence of the exception at said given stage;

transferring said exception code to succeeding stages until said exception code is transferred to a special stage;

suspending further processing at said given stage after said exception code is generated and transferred until an initiation of exception processing sequence;

decoding said exception code at said special stage; and initiating, at said special stage, an exception processing sequence by said pipeline using said stored information when said exception code is decoded at said special stage.

14. The method of claim 13 wherein said storing means comprises a storage stage included after said special stage in said pipeline.

15. A processor having exception processing features comprising:

a pipeline formed by a plurality of consecutive processing stages, each processing stage generating a processing code;

generating means, coupled to each stage of said plurality of consecutive processing stages, for generating an exception processing code at a given stage to indicate the occurrence of an exception at said given stage;

transferring means, coupled to each stage of said plurality of consecutive processing stages, for transferring said exception processing code to succeeding stages until said exception processing code is transferred to a special stage;

suspending means, coupled to each stage of said plurality of consecutive processing stages, for suspending further processing at said given stage after said exception processing code is generated and transferred until an initiation of an exception processing sequence;

means, coupled to said special stage, for decoding said exception processing code at said special stage; and means, coupled to said decoding means and said special stage, for executing said exception processing sequence in response to said decoded exception processing code.

16. The processor set forth in claim 15 further comprising means for processing instructions.

17. The processor set forth in claim 15 wherein said exception is a branch instruction.

18. The processor set forth in claim 15 wherein said exception is an error.

19. The processor set forth in claim 15, said means for generating an exception processing code further comprising means for indicating the kind of exception and the identity of the given stage.

20. The processor set forth in claim 15 further comprising means for suspending processing at each succeeding stage after an exception processing code is transferred to a subsequent stage.

21. The processor of claim 20 wherein said means for suspending processing at each stage includes an input latch at each stage and means for inactivating said input latch when an exception processing code is transferred to a subsequent stage, by inhibiting receipt of an input code thereby disabling generation of said processing code.

22. The processor set forth in claim 15 wherein said means for transferring said exception processing code from each stage includes an output latch at each stage, means for transferring said exception processing code to said output latch, and means for subsequently activating said output latch to transfer said exception processing code from each stage.

23. The processor of claim 15 wherein said means for executing exception processing comprises:

means for resetting selected stages of said pipeline; and means for restarting normal processing following said resetting.

24. The processor set forth in claim 15 further comprising means for processing calculations.

25. The processor forth in claim 15 further comprising means for processing operand information.

26. The processor forth in claim 15 further comprising means for processing address information.

27. The processor in claim 15 further comprising:

means for storing information; and means for using said stored information when said pipeline executes exception processing.

28. The processor in claim 27 wherein:

said storing means comprises a storage stage included subsequent to said special stage in said pipeline.

29. In a processor having a pipeline including a plurality of successive processing stages, each processing stage comprising:

receiving means, coupled to each stage of the plurality of successive processing stages, for receiving information from a previous processing stage;

generating means, coupled to each stage of the plurality of successive processing stages, for generating an exception processing code upon the occurrence of an exception at said processing stage;

transferring means, coupled to each stage of the plurality of successive processing stages, for transferring an exception processing code from said processing stage to a subsequent stage; and suspending means, coupled to each stage of the plurality of successive processing stages, for suspending processing at said stage after an exception processing code is generated at said stage and transferred to said subsequent stage until an exception processing sequence is initiated at a special stage in response to said special stage decoding said exception processing code.

30. The processing stage of claim 29 further comprising:

means for executing said exception processing in response to exception processing instructions provided to said processing stage.

31. The processing stage of claim 30, said means for executing exception processing further comprising means for storing information received by said processing stage, said means for executing exception processing using stored information during exception processing.

32. The processing stage of claim 29, wherein said means for receiving information and means for transferring said exception processing code each comprises a latch.

33. The processing stage of claim 29, said receiving means including a plurality of D flip-flops latched by a signal from a preceding stage.

34. The processing stage of claim 29, said transferring means including a plurality of D flip-flops latched by a signal from said processing means.

35. The processing stage of claim 29, said generating means including means for encoding exception information.

36. A processor, comprising:
a pipeline formed by a plurality of successive pipelined stages, with particular stages identifying a condition which initiates an exception of an exception processing sequence by a special stage of the plurality of pipelined stages, the special stage comprising:
means for receiving an exception processing code from one of said plurality of successive pipelined stages generating said exception processing code upon occurrence of an exception at said one of said plurality of successive pipelined stages;
means, coupled to said receiving means, for decoding said exception processing code, said decoding means including
a first plurality of inverters for receiving said exception processing code from said receiving means;
a second plurality of inverters each coupled to the output of one of said first plurality of inverters;
a plurality of NAND gates coupled to the output of said first and second plurality of inverters, said inverters and NAND gates coupled in a configuration such that only one of said NAND gates is negated for each unique exception processing code received by said decoding means; and
a plurality of output D flip-flops each coupled to a unique NAND gate for indicating the occurrence of said unique exception when said one NAND gate is negated; and
means, coupled to said decoding means for directing control signals to specific pipelined stages in response to said decoded exception processing code.

37. A processor, comprising:
a pipeline formed by a plurality of successive pipelined stages, with particular stages identifying a condition which initiates an execution of an exception processing sequence by a special stage of the plurality of pipelined stages, the special stage comprising:
means for generating an exception processing code when an exception occurs at said special stage;
means for receiving said exception processing code from one of said plurality of successive pipelined stages generating said exception processing code upon occurrence of an exception at said one of said plurality of successive pipelined stages;
means, coupled to said receiving means and said generating means, for decoding said exception processing code; and
means, coupled to said decoding means for directing control signals to specific pipelined stages in response to said decoded exception processing code.

38. A processor, comprising:
a pipeline having at least two special stages with exception processing features, said special stages being located in said pipeline so to optimize exception processing time, and a plurality of successive processing stages, each processing stage of said plurality of successive processing stages being capable of performing normal pipeline processing and identifying a condition initiating an exception processing by one of said at least two special stages, said each processing stage including:
means for receiving exception information from one of said plurality of successive processing stages generating said exception information, upon occurrence of an exception at said one of said plurality of successive processing stages, at a given stage;
means, coupled to said receiving means of said given stage, for transferring said exception information to a succeeding stage; and
means, coupled to said receiving means of said given stage, for suspending normal pipeline processing at said given stage after said given stage receives exception processing information and after said given stage transfers said exception information to said succeeding stage, with said given stage suspended until initiation of said exception processing at one of said at least two special stages, responsive to said exception information and disposed nearest said given stage in a downstream direction.

39. A method for processing an exception generated at a given stage of a plurality of pipelined processing stages capable of performing normal pipeline processing, comprising the steps of:
generating an exception processing code at the given stage;
transferring said exception processing code to each of a series of subsequent stages of the plurality of processing stages until said exception processing code is transferred to a special stage;
suspending normal pipeline processing at said given stage, and each succeeding stage, after transfer of said exception processing code until said exception processing code is transferred to and processed by said special stage;
decoding said exception processing code at said special stage after said exception processing code is received at said special stage; and
directing, from said special stage, control signals to specific pipelined processing stages in response to said decided exception processing code.

40. An apparatus for processing an exception generated in a pipelined processor, comprising:
a series of pipelined processing stages transferring a series of step codes, said series of stages including a given stage, a previous stage and a subsequent stage, each comprising:
an input latch for receiving an input step code from a preceding stage;
an output latch for providing an output code to a following stage;
an exception code generating circuit for producing a stage specific exception step code from said input step code; and
a processing unit for producing a stage specific step code from said input step code as said output code if an exception is not generated during processing, otherwise, said generating circuit providing said stage specific exception step code as said output code if an exception is generated;
said series of stages terminating in a special stage;

means, coupled to said series of stages, for transferring said output code from said given stage to said subsequent stage until said stage specific exception step code is received at said special stage;

means, coupled to said series of stages, for receiving at said stage said input code from said previous stage;

means, coupled to said series of stages, for suspending processing by said given stage after said transfer of said exception step code to said subsequent stage; and said special stage receiving said exception step code including means for initiating exception processing in response to said exception step code.

41. An apparatus for enabling the generation of an exception code in a pipelined processor, comprising:

a series of pipelined processing stages transferring a series of step codes, said series of pipelined processing stages including a given stage, a previous stage and a subsequent stage, each comprising:

an input latch for receipt of an input step code from a preceding stage;

an output latch for holding an output step code for a following stage;

an exception code generating circuit an exception processing code;

means for determining if an exception is generated; and a processing unit, coupled to said input latch, said output latch, said generating circuit, and said determining means, for fetching said input step code from said preceding stage, said processing unit producing a stage specific step code from said fetched input step code and outputting said produced step code to a subsequent stage if an exception is not generated otherwise said processing unit providing information from said input step code to said generating circuit for production of said exception code which identifies the exception and a specific stage in which it was generated, said generating circuit providing its output as said stage specific step code to said output latch, and said processing unit suspending operation of said input latch when said exception is generated.

42. An apparatus for processing an exception generated in a pipeline processor, comprising:

a series of pipelined processing stages terminating in a special stage for transferring a series of step codes, each processing stage comprising:

input means for receiving an input step code from a preceding stage;

output means for providing an output code as an input step code to an input means of a subsequent stage;

an exception code generation circuit for providing a stage specific exception code from input information;

means for determining if an exception is generated; and a processing unit, coupled to said input means, said output means, said exception code generation circuit, and said determining means, for producing a stage specific step code as said output code from said input step code if an exception is not generated from said input step code, otherwise, providing said input information to said exception code generation circuit for generation of said stage specific exception code and substituting said stage specific exception code as said output code if said exception is generated, said processing unit inhibiting operation of said input means if said exception is generated by suspending further processing until exception processing is initiated;

wherein said processing unit of said subsequent stage passes a stage specific exception code received from said preceding stage to a following stage until said stage specific exception code is provided to said special stage; and said special stage decodes said input step code and initiates the pipelined processor to execute an exception processing sequence after said stage specific exception code is decoded at said special stage, wherein said exception processing sequence includes resuming operation of the suspended stages.

43. In a processor having a pipeline formed by a plurality of successive pipelined stages, a stage for initiating an execution of exception processing sequence, comprising:

means for receiving exception information from one of said plurality of successive pipelined stages generating said exception information upon occurrence of an exception at said one of said plurality of successive pipelined stages;

means coupled to said receiving means, for decoding said exception information, said decoding means comprising:

a first plurality of inverters for receiving said exception processing code from said receiving means;

a second plurality of inverters each coupled to an output of one of said first plurality of inverters;

a plurality of NAND gates coupled to an output of said first and second plurality of inverters, said inverters and NAND gates coupled in a configuration such that only one of said NAND gates is negated for each unique exception processing code received by said decoding means; and a plurality of output D flip-flops each coupled to a unique NAND gate for indicating an occurrence of said unique exception processing code when said one NAND gate is negated; and means, coupled to said decoding means and the stage, for initiating execution of exception processing in response to said decoded exception information.

* * * * *